(12) United States Patent
Ito et al.

(10) Patent No.: US 10,703,225 B2
(45) Date of Patent: Jul. 7, 2020

(54) VEHICLE SEAT

(71) Applicant: HONDA MOTOR CO., LTD., Minato-ku, Tokyo (JP)

(72) Inventors: Tomoo Ito, Wako (JP); Makoto Ota, Wako (JP); Atsumi Sakurai, Wako (JP); Kenta Hirayama, Wako (JP); Kenichi Yoshikawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 27 days.

(21) Appl. No.: 16/239,772

(22) Filed: Jan. 4, 2019

(65) Prior Publication Data
US 2019/0241096 A1 Aug. 8, 2019

(30) Foreign Application Priority Data
Feb. 6, 2018 (JP) .................................. 2018-019430

(51) Int. Cl.
*B60N 2/02* (2006.01)
*B60N 2/42* (2006.01)

(52) U.S. Cl.
CPC ......... *B60N 2/0284* (2013.01); *B60N 2/0232* (2013.01); *B60N 2/42* (2013.01); *B60N 2002/0268* (2013.01)

(58) Field of Classification Search
None
See application file for complete search history.

(56) References Cited

U.S. PATENT DOCUMENTS

| | | | | |
|---|---|---|---|---|
| 4,773,703 A | * | 9/1988 | Krugener | B60N 2/0284 297/284.1 |
| 4,924,163 A | * | 5/1990 | Sakamoto | B60N 2/0224 318/569 |

(Continued)

FOREIGN PATENT DOCUMENTS

| | | |
|---|---|---|
| JP | S6097633 U | 7/1985 |
| JP | S6097634 U | 7/1985 |

(Continued)

OTHER PUBLICATIONS

English translation of Notice of Reasons for Refusal for JP Application No. 2018-019430, dated Jul. 30, 2019, 19 pages.

*Primary Examiner* — David E Allred
(74) *Attorney, Agent, or Firm* — Armstrong Teasdale LLP

(57) ABSTRACT

Provided is a vehicle seat capable of stably supporting buttocks of a seated occupant in an adaptive manner according to each right-to-left width of the seated occupant's body, which width is different from occupant to occupant, during a turn of a vehicle. The vehicle seat includes a seat cushion (2) having a seat surface (8) and configured to support buttocks of the seated occupant from below, and a right and left pair of side supports (9, 9) provided on right and left sides of the seat surface, which side supports bulge upward to be higher than the seat surface and allowed to laterally support the buttocks of the seated occupant from either side. Each of the right and left pair of side supports (9, 9) is movable individually in the right-to-left direction with respect to the seat surface. During a turn of the vehicle, one of the side supports on an outer side of the turn is moved inward so as to support the buttocks of the seated occupant from the outer side of the turn. When the turn of the vehicle is completed, the moved side support is returned to its original position.

4 Claims, 8 Drawing Sheets

(56) References Cited

U.S. PATENT DOCUMENTS

| | | | | |
|---|---|---|---|---|
| 8,028,958 B2* | 10/2011 | Kneller | ............. | B64D 11/0601 |
| | | | | 244/118.6 |
| 8,128,167 B2* | 3/2012 | Zhong | ..................... | B60N 2/62 |
| | | | | 297/284.11 |
| 9,010,858 B2* | 4/2015 | Wegelnnann | ........ | B60N 2/0284 |
| | | | | 297/284.11 |
| 9,193,284 B2* | 11/2015 | Line | ....................... | B60N 2/986 |
| 2009/0284059 A1* | 11/2009 | Gupta | ................. | B60N 2/0224 |
| | | | | 297/284.9 |
| 2010/0117412 A1* | 5/2010 | Bicker | ................... | B60N 2/914 |
| | | | | 297/217.1 |
| 2014/0361590 A1* | 12/2014 | Line | ....................... | B60N 2/914 |
| | | | | 297/284.9 |
| 2020/0139851 A1* | 5/2020 | Oshima | ................. | A47C 7/506 |

FOREIGN PATENT DOCUMENTS

| | | | |
|---|---|---|---|
| JP | 2004042792 | A | 2/2004 |
| JP | 2005253867 | A | 9/2005 |
| JP | 2010179900 | A | 8/2010 |
| JP | 2014111406 | A | 6/2014 |
| WO | 2015037600 | A1 | 3/2015 |

* cited by examiner

VEHICLE SEAT

TECHNICAL FIELD

The present disclosure relates to a vehicle seat capable of stably supporting a seated occupant during turning of a vehicle.

BACKGROUND ART

In a vehicle during turning at an intersection or a winding road, inertial forces act on a body of a seated occupant. When the body is not stabilized due to such inertial forces, the seated occupant should have an uncomfortable ride. In particular, when the body of a driver is not stabilized, the driver is required to pay greater attention for driving operation, which makes it hard to have a comfortable ride. For this reason, the prior art has proposed various seat structures configured to stably support a seated occupant during turning of a vehicle.

For example, Patent Documents 1 and 2 teach seat structures configured such that side supports of a seat cushion slidingly move vertically or rotate up and down about respective axes extending in a right-to-left direction to properly support a seated occupant. Patent Document 3 discloses a seat structure in which side supports rotate about respective axes in a front-to-rear direction (longitudinal direction) to support a seated occupant in a vehicle during turning of the vehicle. Patent Document 4 discloses a structure configured to properly support a seated occupant by changing an orientation of a seat back toward a turning direction during turning of a vehicle.

PRIOR ART DOCUMENT(S)

Patent Document(s)

Patent Document 1: JPS60-97633U
Patent Document 2: JPS60-97634U
Patent Document 3: JP2004-042792A
Patent Document 4: WO2015/037600A1

In the seat structures in Patent Documents 1 and 2, since their widths; that is, the lengths between right and left side supports in the right-to-left direction are constant, their seat structures are not capable of properly supporting a seated occupant in an adaptive manner according to each right-to-left width of the seated occupant's body, which width is different from occupant to occupant. In the seat structure in Patent Document 3, although free ends of the side supports can move upward such that the free ends become close to each other during turning of a vehicle, the distance between the rotation axes of the side supports is constant, and thus the seat structure is not capable of properly supporting a seated occupant in an adaptive manner according to each right-to-left width of the seated occupant's body, which width is different from occupant to occupant. Also, the seat structure disclosed in Patent Document 4 is not capable of stably supporting buttocks of a seated occupant during turning of a vehicle.

SUMMARY OF THE INVENTION

The present invention has been made in view of such problems of the prior art, and a primary object of the present invention is to provide a vehicle seat capable of stably supporting buttocks of a seated occupant in an adaptive manner according to each right-to-left width of the seated occupant's body, which width is different from occupant to occupant, during a turn of a vehicle. Moreover, in at least some embodiments of the present invention, an object of the present venation, in addition to the primary object, is to provide a vehicle seat capable of reducing adverse effects of changes in conditions during a turn of a vehicle on a driver's operation.

In accordance with at least some embodiments of the present invention, a vehicle seat (1) comprising: a seat cushion (2) including a seat surface (8) for supporting buttocks of a seated occupant from below, and a right and left pair of side supports (9, 9) provided on right and left sides of the seat surface, wherein the right and left pair of side supports bulge upward to be higher than the seat surface and allowed to laterally support the buttocks of the seated occupant from either side, and each of the right and left pair of side supports is individually movable in a right-to-left direction with respect to the seat surface; a seat back (3) coupled to a rear end of the seat cushion; a first driving mechanism (11) configured to cause each of the right and left pair of side supports to individually move in the right-to-left direction; and a control unit (12) is configured to control the first driving mechanism such that, during a turn of a vehicle, one of the side supports on an outer side of the turn is moved inward, and that, when the turn of the vehicle is completed, the moved side support is returned to its original position.

In this configuration, the right and left pair of side supports are movable in the right-to-left direction and are allowed to be displaced in an adaptive manner according to each right-to-left width of a seated occupant's body, which width is different from occupant to occupant, and thus, the seated occupant's buttocks, which are urged to move by inertial forces during turning of the vehicle, can be stably supported from the outer side of the turn at a proper position. If the right and left pair of side supports inward move in conjunction with each other during turning of the vehicle, the supports would excessively press the seated occupant's buttocks to thereby bring an uncomfortable feeling to the seated occupant. However, in the vehicle seat according to the present embodiment, since each of the right and left pair of side supports is individually movable in the right-to-left direction and only one of the side supports on the outer side of the turn can be moved inward, the vehicle seat can inhibit movement of the inner side support on the inner side of the turn to thereby avoid bringing an uncomfortable feeling to the seated occupant.

In accordance with at least some embodiments of the present invention, the vehicle seat having the above-described configuration is further characterized in that the vehicle seat is a driver's seat, wherein the seat back has a center folding structure having an upper portion (23) configured to support the seated occupant's thorax (21), and a lower portion (22), wherein a second driving mechanism (26) is provided to cause the upper portion to tilt frontward and rearward with respect to the lower portion, and wherein the control unit is configured to control the second driving mechanism such that, during the turn of the vehicle, the upper portion is tilted frontward, and that, when the turn of the vehicle is completed, the tilted upper portion is returned to its original position.

During turning of the vehicle, due to inertial forces caused by the turn, an upper body of the seated occupant tends to lean to the right or left with the buttocks serving as a fulcrum, causing the upper body of the seated occupant to be away from a steering wheel. In this configuration, since the upper portion 23 of the seat back 3 is configured to tilt frontward, the vehicle seat can reduce the change in the distance from the driver to the steering wheel, thereby reducing adverse effects of the change in the distance on the driver's operation to relieve the burden on the driver.

In accordance with at least some embodiments of the present invention, the vehicle seat having any one of the above-described configurations is further characterized in that the right and left pair of side supports are provided with respective pressure sensors (28) for detecting and measuring pressures (Ps) between the seated occupant and the right and left side supports, respectively, and wherein the control unit is configured such that, during the turn of the vehicle, one of the side supports is moved inward until a pressure measured by a corresponding one of the pressure sensors provided in the moved side support becomes equal to or greater than a prescribed value (P2).

In this configuration, since the position of a side support is determined based on the pressure between the seated occupant and the side support, the vehicle seat can avoid the side support from excessively pressing the seated occupant and thereby binging an uncomfortable feeling to the seated occupant.

In accordance with at least some embodiments of the present invention, the vehicle seat having any one of the above-described configurations is further characterized in that the first driving mechanism comprises tension coil springs (13) each having one end secured to the seat surface and another end secured to either of the side supports, and bag parts (14) disposed between the seat surface and the side supports, respectively, wherein the bag parts are capable of expanding and contracting in the right-to-left direction by air pressure, or that elastic bodies (18) are disposed between the seat surface and the right and left pair of side supports, respectively.

In these configurations, since the bag parts or the elastic bodies are provided and gaps are not created between the seat surface and the pair of right and left side supports, the vehicle seat 1 is improved in appearance.

Accordingly, the present invention provides a vehicle seat capable of stably supporting buttocks of a seated occupant in an adaptive manner according to each right-to-left width of the seated occupant's body, which width is different from occupant to occupant, during a turn of a vehicle. Moreover, in some embodiments of the present invention, in addition to the above effect, the present invention provides a vehicle seat capable of reducing adverse effects of changes in conditions during a turn of a vehicle on a driver's operation.

DESCRIPTION OF THE PREFERRED EMBODIMENT(S)

A vehicle seat 1 in accordance with an embodiment of the present invention is described in the following with reference to the drawings. In the following description, the expressions "front", "rear", "right", "left", "up" and "down" refer to the front, rear, right, left, up and down directions of a vehicle, respectively.

Figure 1:
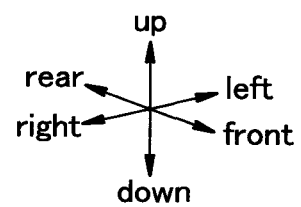
FIG. 1 is a perspective view showing a seat in accordance with one embodiment of the present invention.
Figure 1:
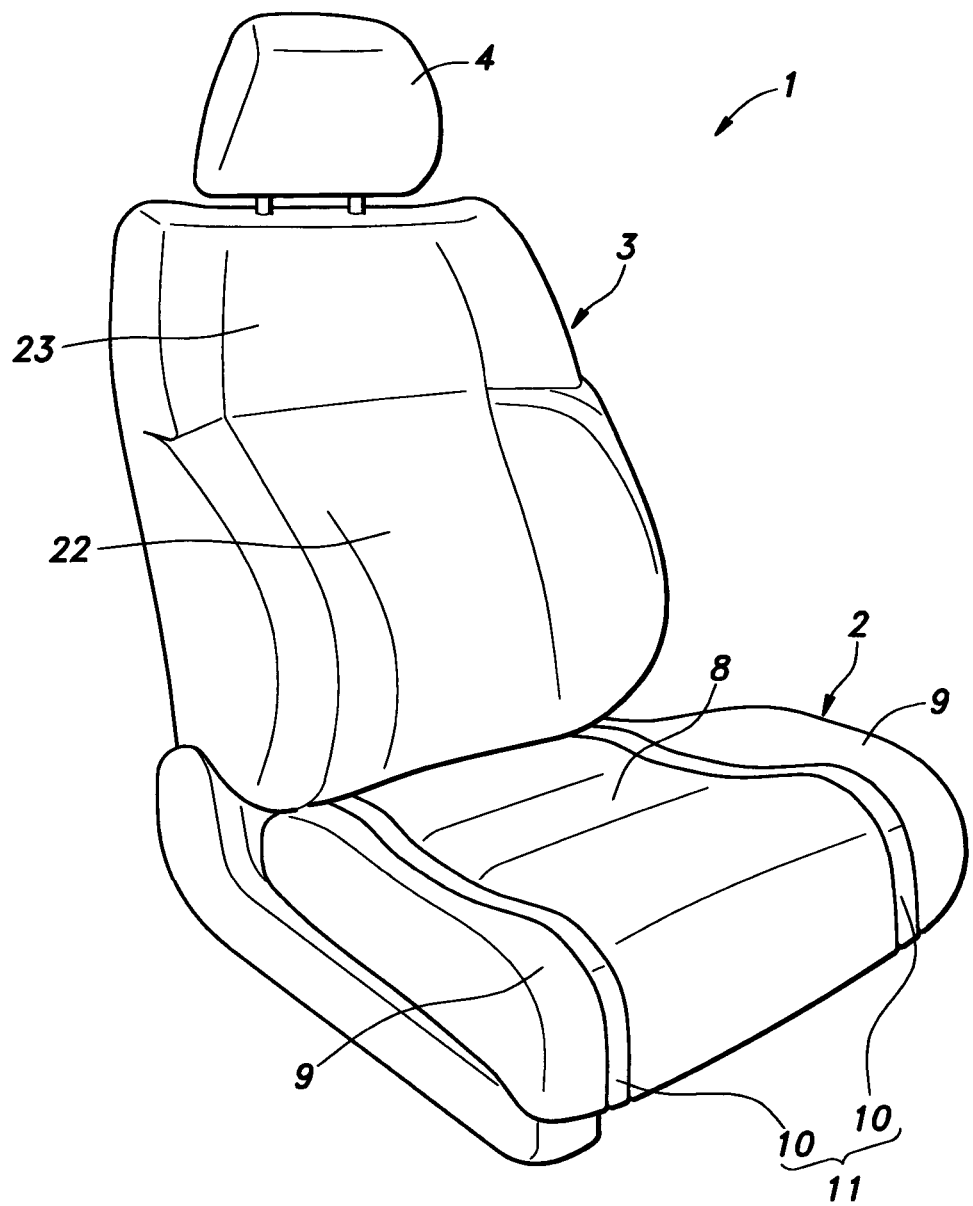

As shown in FIG. 1, the vehicle seat 1 includes a seat cushion 2 configured to support buttocks of a seated occupant, a seat back 3 coupled to a rear end of the seat cushion 2 and configured to support a back of the seated occupant, and a head rest 4 coupled to an upper end of the seat back 3 and configured to support a head of the seated occupant. Each element is comprised primarily of a frame 5, a pad material 6 within which the frame 5 is provided, and a seat skin material 7 for covering the pad material 6 (see FIG. 2). The vehicle seat 1 is a driver's seat.

Figure 2:
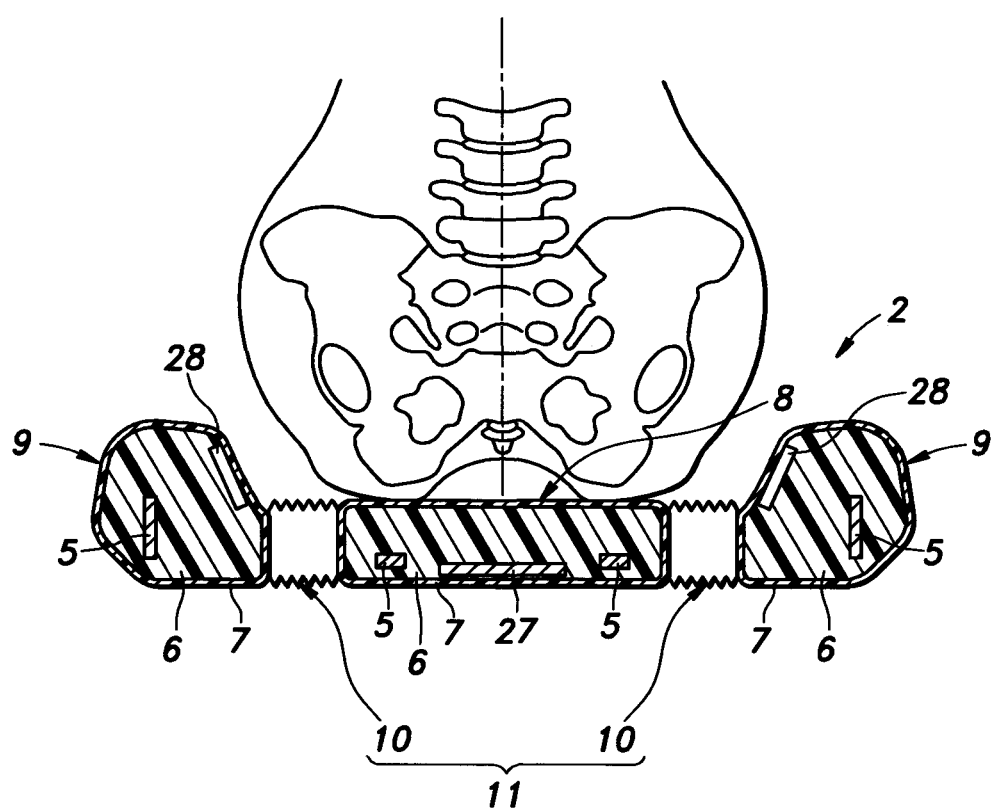
FIG. 2 is a cross-sectional view of a seat cushion of the seat in accordance with the embodiment of the present invention.
Figure 3:
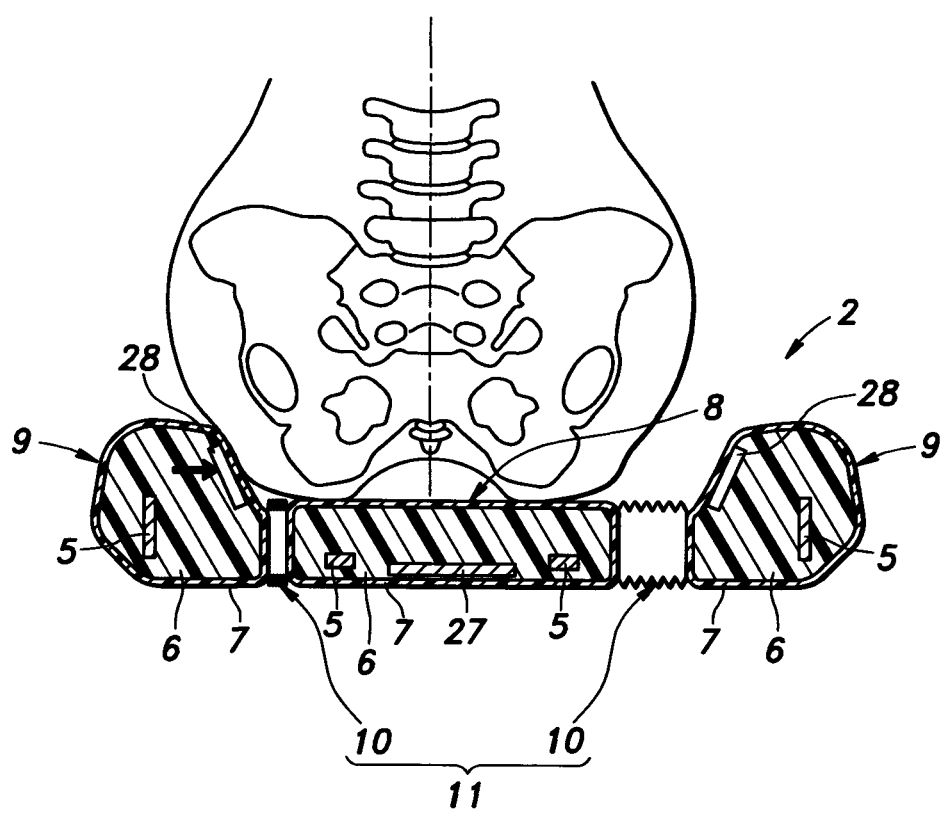
FIG. 3 is a cross-sectional view of the seat cushion of the seat in accordance with the embodiment of the present invention.

FIGS. 2 and 3 are cross-sectional views of the seat cushion 2 as viewed from rear, showing buttocks of a seated occupant as well. As shown in FIG. 2, the seat cushion 2 includes a seat surface 8 located in a center part in a right-to-left direction and configured to support the buttocks of the seated occupant, and a right and left pair of side supports 9, 9 provided on the right and left of the seat surface 8 and bulging upward from the seat surface 8 so as to be allowed to laterally support the buttocks of the seated occupant from either side, and each of the right and left pair of side supports 9, 9 can be individually moved in the right-to-left direction with respect to the seat surface 8. Side support actuators 10 are provided between the seat surface 8 and respective side supports 9 such that each side support 9 is movable in the right-to-left direction with respect to the seat surface 8. A first driving mechanism 11 includes a right and left pair of side support actuators 10, 10 and is controlled by a control unit 12 (see FIG. 7), which individually move the right and left pair of side supports 9, 9 in the right-to-left direction, respectively, such that each of the right and left pair of side supports 9, 9 can support the seated occupant's buttocks in a proper position. FIG. 3 shows the left side support actuator 10 in a state which is different from that shown in FIG. 2 in that the left side support actuator is displaced to the inside (to the side of the seat surface 8). The seat surface 8 and the right and left pair of side supports 9, 9 are composed primarily of their pad materials 6 with respective frames 5 provided therein as respective skeletons, and their seat skin materials 7 for covering the respective pad materials 6.

Figure 4:
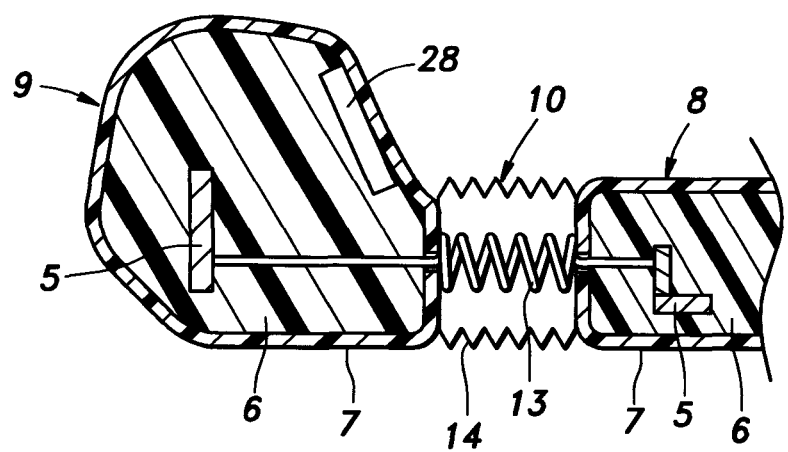
FIG. 4 is an enlarged cross-sectional view of the seat cushion of the seat in accordance with the embodiment of the present invention.

FIG. 4 is an enlarged cross-sectional view showing the left side of the seat cushion 2 as viewed from rear. As shown in Figure. 4, the side support actuator 10 includes the tension coil spring 13 extending in the right-to-left direction and having one end coupled to the frame 5 and the other end coupled to the side support 9, the bag part 14 disposed between the seat surface 8 and the side support 9 and capable of expanding and contracting in the right-to-left direction by air pressure, and an air pressure controller (not shown) for injecting and discharging air to and from the bag part 14. Preferably, upper, lower, front and rear faces of the bag part 14 form a bellows-shape so as to be expandable and contractible to a large extent in the left-right direction. When air is injected into the bag part 14, the bag part 14 expands against a spring force of the tension coil spring 13 and the side support 9 is moved outward; that is, away from the seat surface 8 (see FIG. 2). When air is discharged from the bag part 14, the bag part 14 contracts due to the spring force of the tension coil spring 13 and the side support 9 is moved inward; that is, toward the seat surface 8 (see FIG. 3).

Figure 5:
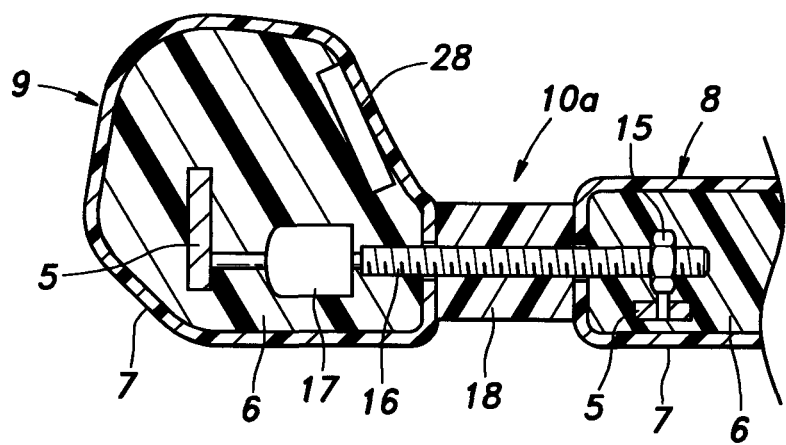
FIG. 5 is an enlarged cross-sectional view of a seat cushion of a seat in accordance with a variation of the embodiment of the present invention.

FIG. 5 is an enlarged cross-sectional view showing the left side of the seat cushion 2 as viewed from rear, and also showing a side support actuator 10a in accordance with a variant of the embodiment. The side support actuator 10a has a nut 15 secured to the frame 5 of the seat surface 8, a feed screw 16 extending in the right-to-left direction and axially supported by the side support 9 and configured to thread into the nut 15, and an electric motor 17 secured to the frame 5 of the side support 9 and configured to rotate the feed screw 16 around its axis line. When the electric motor 17 is actuated to rotate the feed screw 16 in one direction about the axis line, the feed screw 16 moves outward with respect to the nut 15, thereby causing the side support 9 to move outward. When the feed screw 16 is rotated in the opposite direction, the feed screw 16 moves inward with respect to the nut 15, thereby causing the side support 9 to move inward. The nut 15 may be secured to the frame 5 of the side support 9, and the feed screw 16 may be pivotally supported by the seat surface 8, and the electric motor 17 may be secured to the frame 5 of the seat surface 8. An elastic body 18 such as a body made of urethane is provided between the seat surface 8 and the side support 9. The elastic body 18 may be a planar elastic body such as a cloth stretched between the seat surface 8 and the side support 9 so as to shield the feed screw 16 from the seated occupant. Any known suitable actuator may be used in the first driving mechanism 11.

Figure 6:
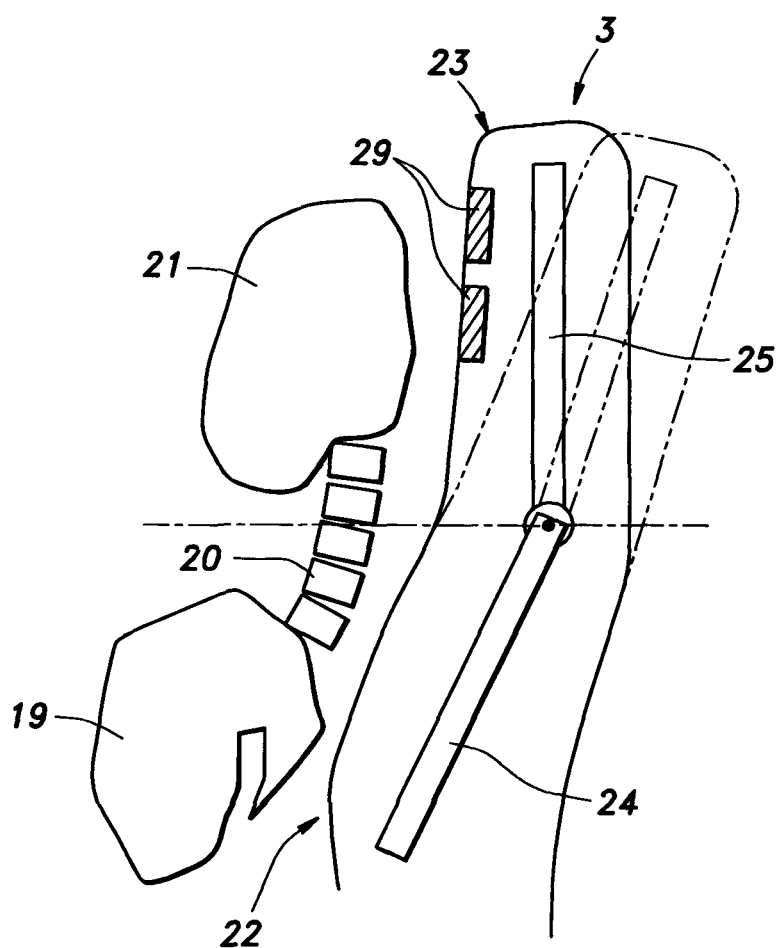
FIG. 6 is a cross-sectional view of a seat back of the seat in accordance with the embodiment of the present invention.
Figure 7:
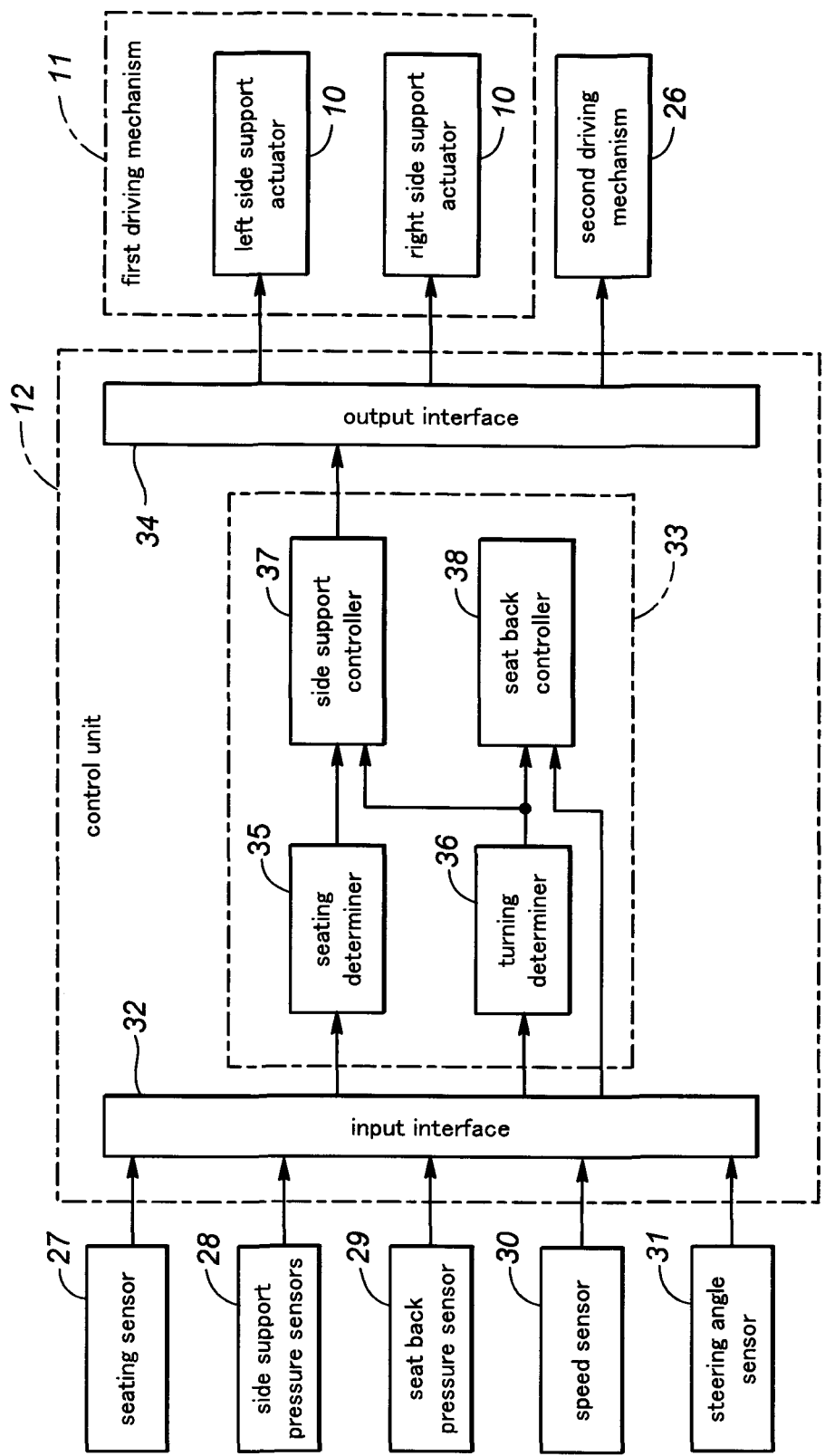
FIG. 7 is a block diagram of the seat in accordance with the embodiment of the present invention.

FIG. 6 is a cross-sectional view of the seat back 3 as viewed from the left side. FIG. 6 also shows the seated occupant's pelvis 19, lumbar spine 20 and thorax 21. As shown in FIG. 6, the seat back 3 includes a lower portion 22 which supports a back part of the pelvis 19 and/or a part of the lumbar spine 20 of the seated occupant, and an upper portion 23 which supports mainly the thorax 21 of the seated occupant. An upper end of a lower frame 24 provided in the lower portion 22 rotatably supports a lower end of an upper frame 25 provided in the upper portion 23 so that upper frame 25 is rotatable about an axis line in the right-to-left direction, whereby the seat back 3 has a center folding structure in which the upper portion 23 tilts frontward and rearward with respect to the lower portion 22. As shown in FIG. 7, a second driving mechanism 26 controlled by the control unit 12 causes the upper portion 23 to tilt with respect to the lower portion 22. The second driving mechanism 26 may be any known suitable actuator. For example, the second driving mechanism 26 may be comprised primarily of an electric motor, and a reduction gear train configured to mesh with the electric motor and rotate a rotating shaft body, or comprised primarily of a link mechanism.

As shown in FIGS. 2 to 7, the seat surface 8 is provided with a seating sensor 27 for detecting the seated occupant's seating, and each side support 9 is provided with a side support pressure sensor 28 for detecting and measuring a pressure Ps between the buttocks of the seated occupant and the side support 9. A seat back pressure sensor 29 is provided in the upper portion 23 of the seat back 3 for detecting a pressure Pb between the thorax 21 of the seated occupant and the upper portion 23 of the seat back 3. The seating sensor 27, the side support pressure sensors 28 and the seat back pressure sensor 29 are embedded in the respective pad materials 6. Moreover, as shown in FIG. 7, the vehicle is provided with a speed sensor 30 and a steering angle sensor 31 in order to determine whether or not the vehicle is turning. Instead of the speed sensor 30 and the steering angle sensor 31, turning of the vehicle may be determined by another known means such as a gyro sensor, or alternatively, turning of the vehicle may be determined based on information on map, the current position, a destination and other information provided by a navigation system.

As shown FIG. 7, an ECU, which is used as the control unit 12 for controlling the first driving mechanism 11 and the second driving mechanism 26, includes an input interface 32 for receiving data from the sensors 27 to 31, a computing section 33 for performing various operations, and an output interface 34 for outputting one or more instructions from the computing section 33 to the first driving mechanism and the second driving mechanism. The computing section 33 includes a seating determiner 35 for determining whether or not a seated occupant is seated, a turning determiner 36 for determining whether or not the vehicle is turning, a side support controller 37 for controlling the positions of the side supports 9, and a seat back controller 38 for controlling the position of the upper portion 23 of the seat back 3.

Figure 8:
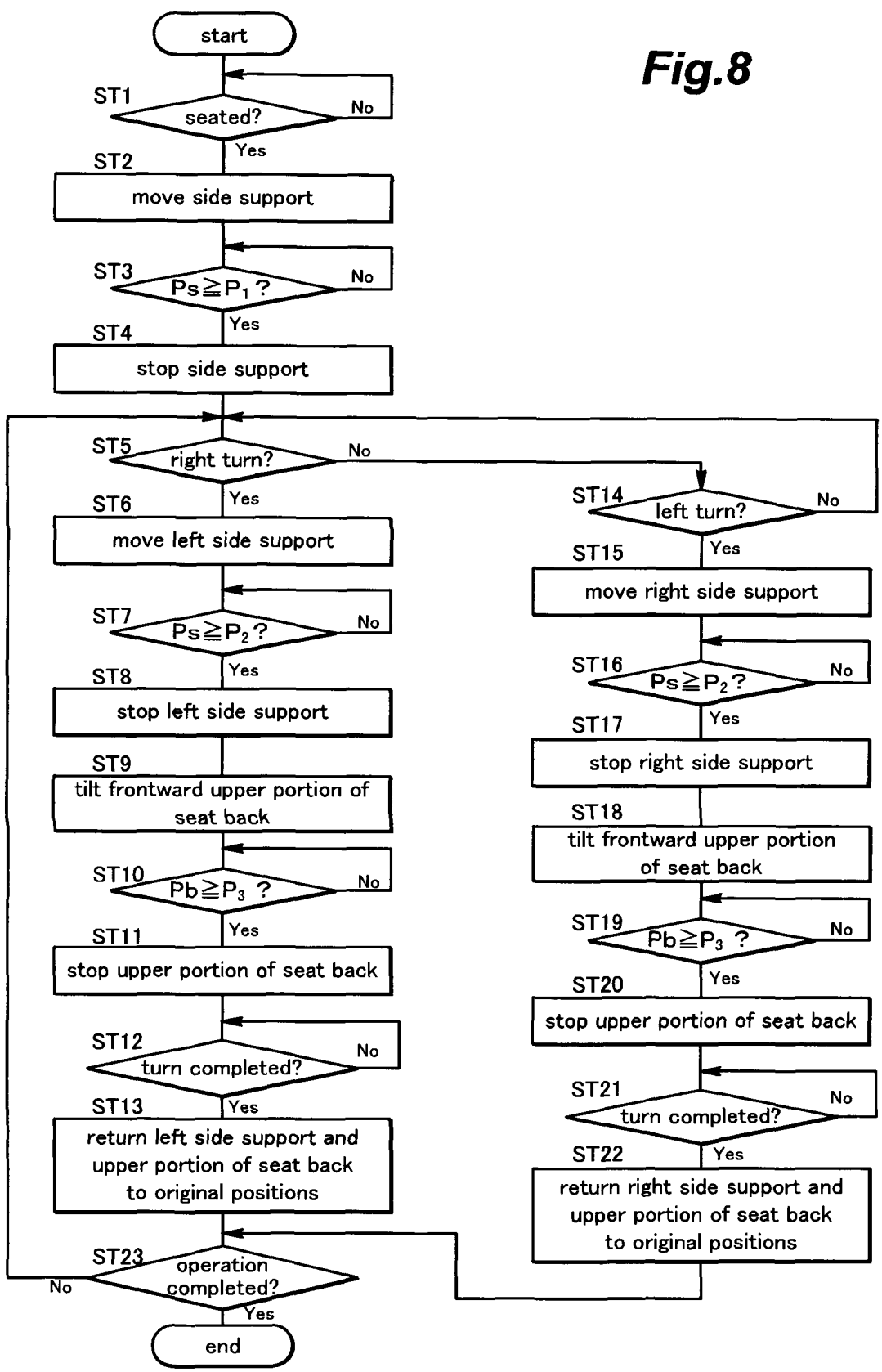
FIG. 8 is a flow diagram showing a control procedure of the seat in accordance with the embodiment of the present invention.

Next, with reference to FIGS. 7 and 8, a control procedure performed by the control unit 12 in order to control the side supports 9 and the upper portion 23 of the seat back 3 will be described.

First, the right and left pair of side supports 9, 9 are disposed at their basic positions, which are the positions of the right and left side supports 9, 9 when the vehicle is moving straight or stopped (ST1 to ST4).

When the seating sensor 27, which is a pressure sensor, detects a pressure indicating the presence of a seated occupant while the vehicle is electrically energized (ST1), the side support controller 37 causes the left and right side supports 9, 9 to move inward by the first driving mechanism 11 (ST2). For each of the left and right side supports, when the pressure Ps between the buttocks of the seated occupant and the side support measured by a corresponding side support pressure sensor 28 reaches a first prescribed value P1 (ST3), the side support controller 37 stops the side support 9 (ST4) and the basic position of the side support 9 is determined with respect to the seated occupant. The basic position of each side support 9 may be a position where the side support 9 is moved outward by a prescribed distance from the position where the pressure Ps between the buttocks of the seated occupant and the side support reaches the first prescribed value (P1). Although the basic position of the upper portion 23 of the seat back 3 is manually set, the basic position of the upper portion 23 may be automatically set in the same manner as the side supports described above. In order to prepare for cases where a body width of the seated occupant in the right-to-left direction is greater than that of the seated occupant used last time, the right and left pair of side supports 9, 9 may be moved outward to their prescribed positions before ST2.

Next, during a turn of the vehicle, the upper portion 23 of the seat back 3 and one of the side supports 9 on an outer side of the turn are disposed at their turning positions (ST5 to ST22).

When the turning determiner 36 determines that the vehicle is turning to the right based on the detection results of the speed sensor 30 and the steering angle sensor 31 (ST5), the side support controller 37 causes the left side support 9 to move inward by the left side support actuator 10 (ST6). When the pressure Ps between the buttocks of the seated occupant and the side support on the left side measured by the side support pressure sensor 28 reaches a second predetermined value P2 (ST7), the side support controller 37 stops the left side support 9 (ST8). The position of the left side support 9 at this point of time is the position of the left side support 9 during turning of the vehicle, that is, the turning position. Instead of determining the turning position based on the pressure Ps, the turning position of the side support 9 may be determined based on, for example, a moving distance from the basic position (a prescribed distance, or a distance which is determined according to an inertial force calculated from the vehicle speed and the steering angle). Preferably, during turning of the vehicle to the right, the right side support 9 is inhibited to move at least inward from the basic position so as to avoid excessively pressing the buttocks of the seated occupant.

The seat back controller 38 causes the upper portion 23 of the seat back 3 to tilt frontward by the second driving mechanism 26 (ST9). When the pressure Pb between the thorax 21 of the seated occupant and the upper portion 23 of the seat back 3 measured by the seat back pressure sensor 29 reaches a third prescribed value P3 (ST10), the seat back controller 38 stops the upper portion 23 of the seat back 3 (ST11). The position of the upper portion 23 of the seat back 3 at this point of time is the position of the upper portion 23 of the seat back 3 during turning of the vehicle, that is, the turning position of the upper portion 23 of the seat back 3. Instead of determining the turning position based on the pressure Pb, the turning position of the upper portion 23 of the seat back 3 may be determined based on, for example, an angular displacement from the basic position (a prescribed angle, or an angle determined according to the inertial force calculated from the vehicle speed and the steering angle). Although it is preferable that the movement of the side support 9 from the basic position to the turning position (ST6 to ST8) is carried out simultaneously with the movement of the upper portion 23 of the seat back 3 from the basic position to the turning position (ST9 to ST11), the side support 9 may be moved to the turning position before or after the upper portion 23 is moved to the turning position.

When turning determiner 36 determines that a turn of the vehicle is completed based on the detection results of the speed sensor 30 and the steering angle sensor 31 (ST12), the side support controller 37 and the seat back controller 38 return the side support 9 and the upper portion 23 of the seat back 3 to their basic positions, respectively (ST13).

When the vehicle turns to the left, the control unit controls the vehicle seat in an opposite manner regarding the right-to-left direction to the process for turning of the vehicle to the right as described above (ST14 to ST22).

The control procedure for turning of the vehicle (ST5 to ST22) is repeatedly performed until the operation of the vehicle is generally completed by, for example, turning off electric power to the vehicle (ST23).

The effects achieved by the vehicle seat 1 will be described. The right and left pair of side supports 9, 9 are movable in the right-to-left direction and the right and left pair of side supports 9, 9 are allowed to be displaced in an adaptive manner according to each right-to-left width of a seated occupant's body, which width is different from occupant to occupant, and thus, the seated occupant's buttocks, which are urged to move by inertial forces during turning of the vehicle, can be stably supported from the outer side of the turn at a proper position. If the right and left pair of side supports 9, 9 inward move in conjunction with each other during turning of the vehicle, the supports would excessively press the seated occupant's buttocks to thereby bring an uncomfortable feeling to the seated occupant. However, in the vehicle seat 1 according to the present embodiment, since each of the right and left pair of side supports 9, 9 is individually movable in the right-to-left direction and only one of the side supports 9 on the outer side of the turn can be moved inward, the vehicle seat can inhibit movement of the inner side support 9 on the inner side of the turn to thereby avoid bringing an uncomfortable feeling to the seated occupant.

Furthermore, during turning of the vehicle, even if the buttocks of the seated occupant does not move, an upper body of the seated occupant leans to the right or left due to inertial forces caused by the turn. When an upper body of a driver leans to the right or left, the distance from the driver to a steering wheel increases, and thus, the driver needs to perform a driving operation according to the change in the distance. In the vehicle seat 1 according to the present embodiment, the upper portion 23 of the seat back 3 is configured to tilt frontward during turning of the vehicle so as to push frontward a driver's upper body which is leaning to the right or left. Thus, the vehicle seat can reduce the change in the distance from the driver to the steering wheel, thereby reducing adverse effects of the change in the distance on the driver's operation to relieve the burden on the driver.

In addition, since the turning positions of a side support 9 and the upper portion 23 of the seat back 3 are determined based on the pressure Ps between the seated occupant and the side support 9 and the pressure Pb between the seated occupant and the upper portion 23 of the seat back 3, the vehicle seat can avoid bringing an uncomfortable feeling to the seated occupant by excessively pressing the seated occupant by the side support 9 and the upper portion 23 of the seat back 3.

Moreover, since the bag parts 14 or the elastic bodies 18 are provided and gaps are not created between the seat surface 8 and the pair of right and left side supports 9, 9, the vehicle seat 1 is improved in appearance.

Although the present invention has been described based on some specific embodiments, the embodiments are not intended to limit the scope of the present invention. Many modifications and variations of the invention are possible in light of the above teachings. For example, the above-described vehicle seat may be used as a seat other than the driver's seat, or alternatively, the vehicle seat may be configured such that only the side supports are moved or only the upper portion of the seat back is moved during turning of the vehicle.

GLOSSARY 1 vehicle seat
2 seat cushion
3 seat back
8 seat surface
9 side support
10, 10a side support actuator
11 first driving mechanism
12 control unit
13 tension coil spring
14 bag part
18 elastic body
21 thorax
22 lower portion
23 upper portion
26 second driving mechanism
28 side support pressure sensor

The invention claimed is:

1. A vehicle seat comprising:
a seat cushion including a seat surface for supporting buttocks of a seated occupant from below, and a right and left pair of side supports provided on right and left sides of the seat surface, wherein the right and left pair of side supports bulge upward to be higher than the seat surface and allowed to laterally support the buttocks of the seated occupant from either side, and each of the right and left pair of side supports is individually movable in a right-to-left direction with respect to the seat surface;
a seat back coupled to a rear end of the seat cushion;
a first driving mechanism configured to cause each of the right and left pair of side supports to individually move in the right-to-left direction; and
a control unit configured to control the first driving mechanism such that, during a turn of a vehicle, one of the side supports on an outer side of the turn is moved inward, and that, when the turn of the vehicle is completed, the moved side support is returned to its original position.

2. The vehicle seat according to claim 1, wherein the vehicle seat is a driver's seat,
wherein the seat back has a center folding structure having an upper portion configured to support the seated occupant's thorax, and a lower portion,
wherein a second driving mechanism is provided to cause the upper portion to tilt frontward and rearward with respect to the lower portion, and
wherein the control unit is configured to control the second driving mechanism such that, during the turn of the vehicle, the upper portion is tilted frontward, and that, when the turn of the vehicle is completed, the tilted upper portion is returned to its original position.

3. The vehicle seat according to claim 1, wherein the right and left pair of side supports are provided with respective pressure sensors for detecting and measuring pressures between the seated occupant and the right and left side supports, respectively, and
wherein the control unit is configured such that, during the turn of the vehicle, one of the side supports is moved inward until a pressure measured by a corresponding one of the pressure sensors provided in the moved side support becomes equal to or greater than a prescribed value.

4. The vehicle seat according to claim 1, wherein the first driving mechanism comprises tension coil springs each having one end secured to the seat surface and another end secured to either of the side supports, and bag parts disposed between the seat surface and the side supports, respectively, wherein the bag parts are capable of expanding and contracting in the right-to-left direction by air pressure.

* * * * *